June 2, 1953 A. LE R. OLSON 2,640,927

SYSTEM FOR STUDYING ELECTRICAL WAVES

Filed May 16, 1951 2 Sheets-Sheet 1

INVENTOR.
ALTON LEROY OLSON
BY Darby & Darby
ATTORNEYS

June 2, 1953 A. LE R. OLSON 2,640,927

SYSTEM FOR STUDYING ELECTRICAL WAVES

Filed May 16, 1951 2 Sheets-Sheet 2

INVENTOR.
ALTON LEROY OLSON
BY Darby & Darby
ATTORNEYS

Patented June 2, 1953 2,640,927

UNITED STATES PATENT OFFICE 2,640,927

SYSTEM FOR STUDYING ELECTRICAL WAVES

Alton Le Roy Olson, Hackensack, N. J., assignor to Allen B. Du Mont Laboratories, Inc., Clifton, N. J., a corporation of Delaware Application May 16, 1951, Serial No. 226,694

2 Claims. (Cl. 250—27)

This invention relates to instruments for observing repetitive electrical phenomena and particularly to instruments for selecting one of a group of similar electrical impulses and rendering it visible upon the face of a cathode ray tube.

It is frequently desirable to observe the waveform of a television signal or the blanking or synchronizing portion thereof, and in order to clarify the observed pattern, only a small part of each television picture signal, such as one line, is chosen for presentation. Means for selecting a particular line in each television picture signal for exhibition are disclosed in copending application Serial No. 37,342 by Ralph P. Abbenhouse, now Patent No. 2,615,979. The present invention utilizes one form of the method taught therein but accomplishes the result with different, and generally less complex, circuits.

It is one object of this invention to provide a simplified and improved selecting circuit for use with oscillographic measuring instruments. Other objects will be apparent after studying the following specification together with the drawings in which.

The components of the circuit shown are chosen particularly for operation at the principal frequencies of the present day television standards, 60 C. P. S., 30 C. P. S., and 15750 C. P. S. The invention is applicable, however, to other standards, frequencies and uses, changes in components, therefore, being a mere matter of design for those skilled in the art.

Figure 1:
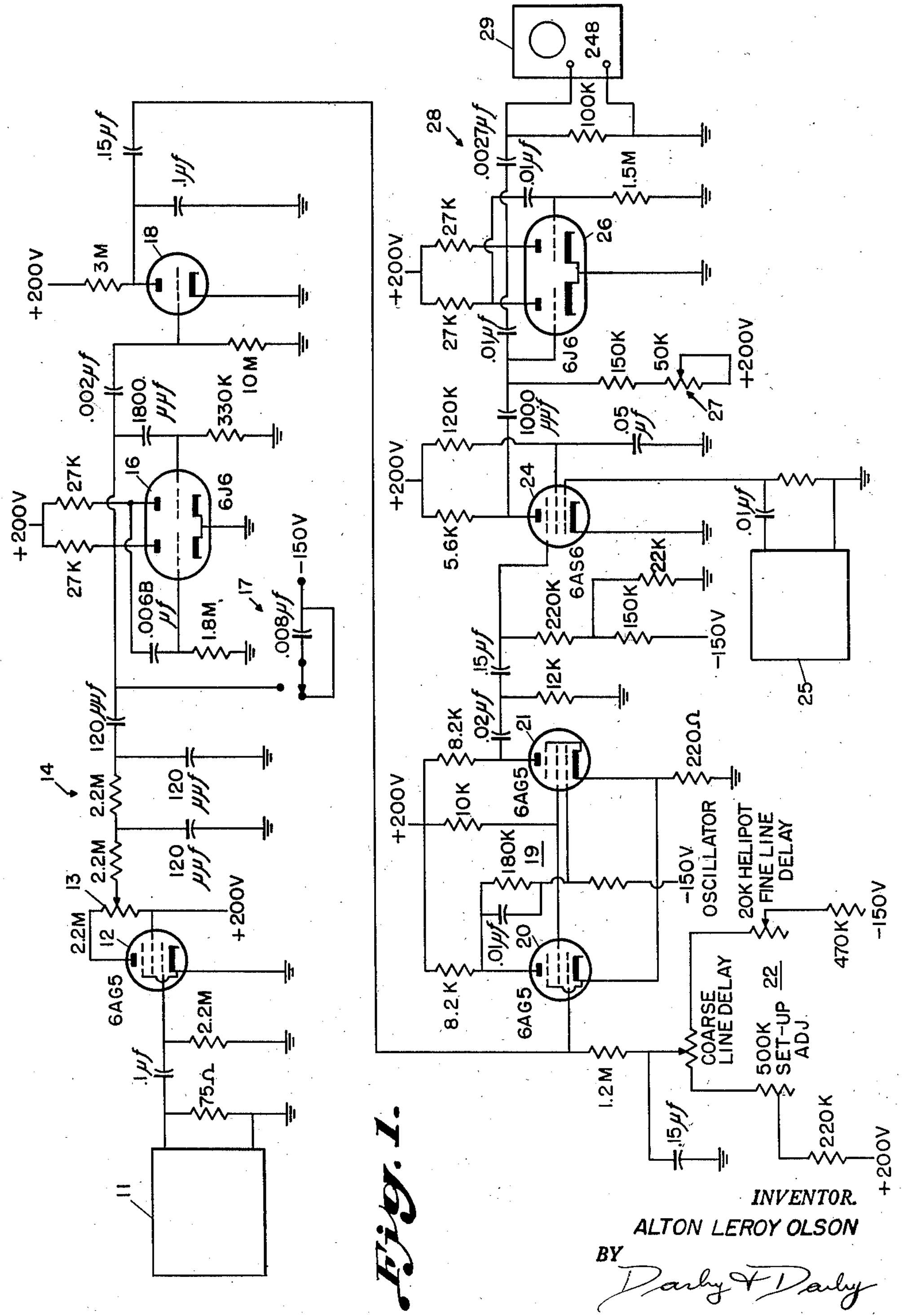
Figure 1 is a schematic diagram of the invention.

In Figure 1 a source 11 of television synchronizing impulses is connected to an amplifier 12 having a gain control 13 in its output circuit. The gain control 13 is joined through an integrating circuit 14 to a multivibrator 16 to enable the operator to choose the odd-line or even-line field. The input circuit of a sawtooth wave voltage generator 18 is connected to the output circuit of the multivibrator 16, and the output circuit of generator 18 in turn is connected to an oscillator 19 comprising a pair of amplifier tubes 20 and 21 and including a delay circuit 22 as an integral part thereof. A differentiating circuit 23 connects the oscillator 19 to one input circuit of a coincidence gate, or mixer, circuit 24 having a source 25 of positive pulses with a repetition rate of 15,750 per second connected to a second input circuit thereof. Following the coincidence circuit 24 is a single-shot multivibrator 26, comprising a continuous delay circuit 27, which is connected through a differentiating circuit 28 to the synchronizing circuit of an oscillograph 29.

Figure 2:
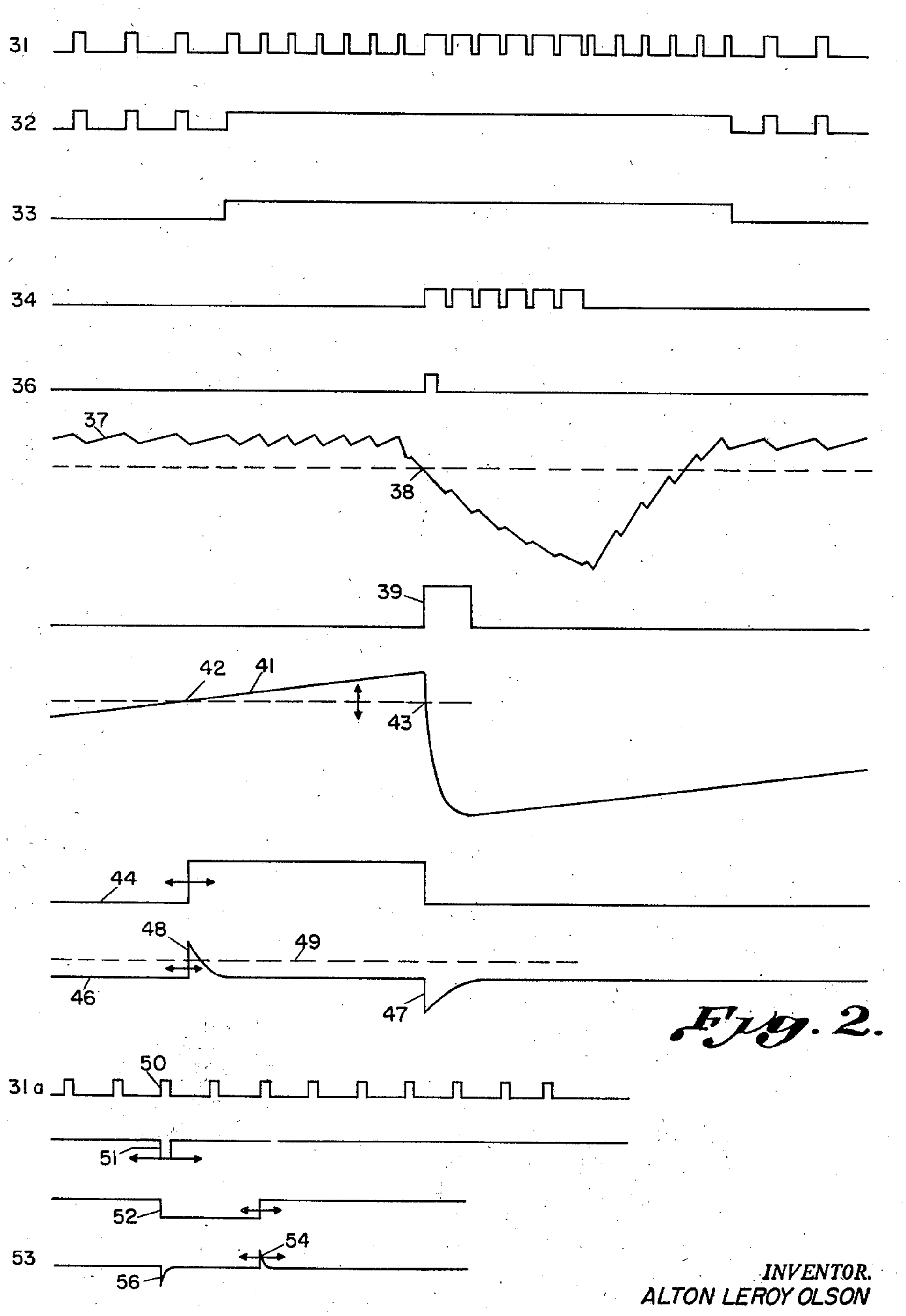
Figure 2 shows typical waveforms of a television signal.

The operation of the circuit in Figure 1 can best be explained with reference to Figure 2, which shows typical television signal waveforms. The signal 31 generated by the source 11 is a normal, composite synchronizing signal, although a composite blanking signal 32 may be used, as well as a vertical blanking signal 33, synchronizing signal 34, or driving signal 36.

In the event that the composite synchronizing signal 31 or the composite blanking signal 32 is supplied by generator 11, it is necessary to separate a vertical, or low frequency component from the remainder of the signal in order to provide a triggering signal for the selector circuits. This is accomplished by means of the integrating circuit 14, which transforms signal 31, for instance, into signal 37.

The 30 C. P. S. multivibrator 16 is triggered when signal 37 reaches voltage level 38, but the circuit components of the multivibrator allow it to operate only every other field. If it happens that the multivibrator 16 starts off on the even field of the television signal and it is desired to examine the signal corresponding to some line or lines in the odd field, it is only necessary to actuate the switch of the field selector circuit 17 to cause the multivibrator 16 to change to the odd field trigger. Circuit 17 operates by supplying an additional charge to the 30 C. P. S. multivibrator 16 to cause it to skip a beat; and consequently, the switch may be of the momentary-contact, spring-return variety.

The multivibrator 16 provides a sharp voltage pulse 39 of sufficient amplitude to trigger the sawtooth-wave generator 18, which, in this case, is of the high-vacuum type. The output voltage of the generator 18 is shown as waveform 41 in Figure 2.

The oscillator 19 is very much like a multivibrator without feedback condensers. It is a bi-stable oscillator comprising two amplifier tubes 20 and 21 of which tube 21 is normally conducting. When the sawtooth voltage 41 reaches a level 42 tube 20 starts to conduct, dropping the voltage level at the plate thereof and cutting off tube 21, thereby further increasing the conduction of tube 20. Tube 20 continues to conduct as long as the voltage applied to the grid thereof exceeds level 42, and when the voltage drops at the end of the sawtooth period, tube 21 resumes conduction at time 43. The resultant rectangular voltage wave 44 produced at the plate of the tube 21 has a duty cycle determined by the setting of the resistors in the delay circuit 22.

It is one of the properties of this oscillator that the duty cycle is variable over a wide range, limited only by the retrace time of the sawtooth wave. However, since the repetition rate of the sawtooth, and hence of rectangular wave 43, is one-half the television frame rate, the line or lines which it is desired to observe may be chosen near the center of the duty cycle range; i. e., between 25% and 75%. The wide duty cycle range becomes important only when the whole selector circuit is operated at the same repetition rate as the signal to be observed.

The properties of the oscillator most useful in the present mode of operation are in the provision of exact, stable clipping of a comparatively slowly varying voltage, together with great amplification of the clipped voltage without having inherent time, or frequency, restrictions. The stability and freedom from time restrictions obtain mainly because of the absence of condensers in so-called "time constant" circuits common to multivibrators, and the high amplification is the result of the positive feedback used.

The rectangular wave 44 is differentiated by circuit 23 to obtain the wave 46 having a negative-going voltage spike 47 relatively fixed for each cycle of wave 46. Spike 47 must occur within the flyback time of the sawtooth wave 41. A positive-going spike voltage 48 is also produced, and, as has been explained heretofore, this spike 48 is variable over almost the entire period of the sawtooth wave 41.

The wave 46 is applied to one input circuit of the mixer tube 24 comprising the suppressor grid, which is biased sufficiently negative to block current through the tube 24 when the signal on the suppressor grid is below the level 49. The negative spike 47 is thus effectively clipped off and only the positive spike voltage 48 has any effect on the tube 24. The spike voltage 48 may be chosen to have an amplitude sufficient to overload the suppressor grid enough to clip off the top of spike 48, although this is not absolutely necessary. The components in the circuit 23 are chosen so as to differentiate the rectangular wave 44 to produce spike voltage 48 which preferably has a duration less than 1/15000 of a second.

When the gate tube 24 is rendered conductive by the spike voltage 48, it is then in a condition to amplify one of the pulses from the source 25 applied to the second input circuit comprising the cathode and control grid of tube 24. The source 25 might well be the source 11 and the output signal of source 25 would then be signal 31. To show that source 25 might be different—just a source of horizontal driving pulses, for instance, the output signal will be labelled 31a in Figure 2. If the duration of the spike 48 is sufficiently short, it may be that no horizontal synchronizing impulses from the source 25 will occur coincidentally therewith, but a small variation of the potentiometers in the delay circuit 22 will cause the spike 48 to coincide with one of the impulses 50. This impulse, and only this impulse, will be amplified by the tube 24 once each television frame so that each 1/30 of a second a negative impulse 51 is applied to the multivibrator 26. By varying the potentiometer in the delay circuit 22, different horizontal synchronizing impulses may be chosen as pulse 51. By operating the field selector circuit 17 the portion of a television frame that cannot be covered by complete variation of the potentiometer in the delay circuit 22 may also be covered.

The multivibrator 26 has a continuous duty cycle control, or delay control 27 to set the duty cycle of the rectangular output voltage 52. This output voltage is differentiated in the differentiating circuit 28 to form a voltage 53 having a positive impulse 54 and a negative impulse 56 which coincides with the negative impulse 52. The positive impulse 54 is variable within a relatively narrow limit of approximately one horizontal line of voltage wave 31 to allow a continuous shift of the time axis origin of the pattern on the face of the cathode ray tube. This small, and therefore stable, shift afforded by the multivibrator 26, together with the line-by-line shift provided by the delay circuit 22, is all that is necessary to allow an oscillograph 29 such as the Du Mont Type 248 to examine any part of any line in the television frame period if the oscillograph 29 is synchronized on the pulses 54.

Although this invention has been illustrated by a specific embodiment, changes may be made therein without departing from the scope of the following claims.

What is claimed is:

1. An electrical circuit comprising a source of electrical impulses; a generator of a sawtooth wave voltage, said generator being connected to said source and synchronized by said impulses; a bi-stable oscillator connected to said generator and triggered by said sawtooth voltage, the output voltage of said oscillator having a rectangular waveform, said oscillator having an adjustable bias source to set the time of triggering of said oscillator with respect to the starting time of said sawtooth wave; a differentiating circuit connected to said oscillator to differentiate said rectangular wave; a source of positive electrical impulses; a gate circuit having one input circuit connected to said second source and a second input circuit connected to said differentiating circuit, said gate circuit being biased to have an output voltage signal only when a positive output signal from said differentiating circuit coincides with a positive pulse from said second source; and a single-shot multivibrator connected to said gate circuit to be triggered by said output voltage therefrom, said multivibrator having a duty cycle adjustment.

2. An electrical circuit comprising a source of electrical impulses in which some of said impulses have a higher repetition rate and others of said impulses have a lower repetition rate; an integrating circuit connected to said source to separate said lower repetition rate impulses from said higher repetition rate impulses; a triggering circuit connected to said integrating circuit and synchronized by said lower repetition rate impulses; a generator of a sawtooth voltage wave connected to said triggering circuit to be triggered thereby; an oscillator connected to said generator and triggered by said sawtooth wave, the output voltage of said oscillator having a rectangular waveform, said oscillator having an adjustable bias source to set the time of triggering thereof with respect to the starting time of said sawtooth wave; a differentiating circuit connected to said oscillator to differentiate said rectangular wave; an integrating circuit having one input circuit connected to said source of electrical impulses and a second input circuit connected to said differentiating circuit, said gate circuit being biased to have an output voltage signal only when one of said impulses from said source coincides with a positive pulse from said differentiating circuit; and a single-shot multivibrator connected to said gate circuit to be triggered by said output signal therefrom, said multivibrator comprising an adjustment to vary the duty cycle of the output pulse from said multivibrator over a range of less than ten per cent.

ALTON LE ROY OLSON.

References Cited in the file of this patent

UNITED STATES PATENTS

| Number | Name | Date |
|---|---|---|
| 2,545,464 | Hoeppner et al. | Mar. 20, 1951 |
| 2,579,586 | Kroft | Dec. 25, 1951 |